May 9, 1967 P. J. ERNISSE 3,318,217
PHOTOFLASH SYNCHRONIZING MECHANISM
Filed Feb. 23, 1965
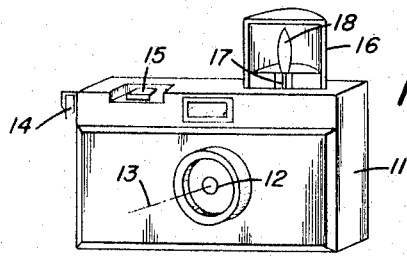
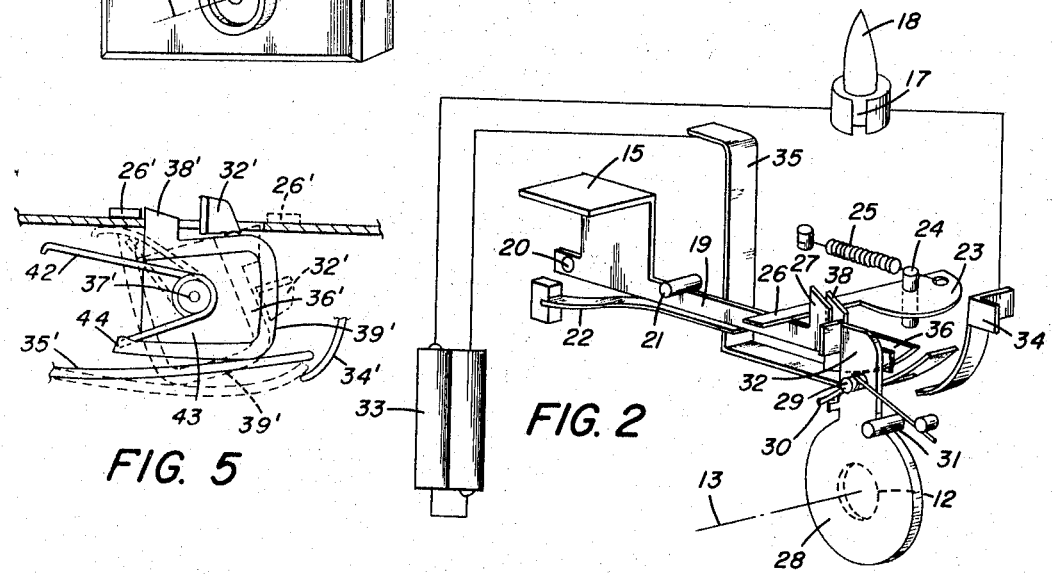
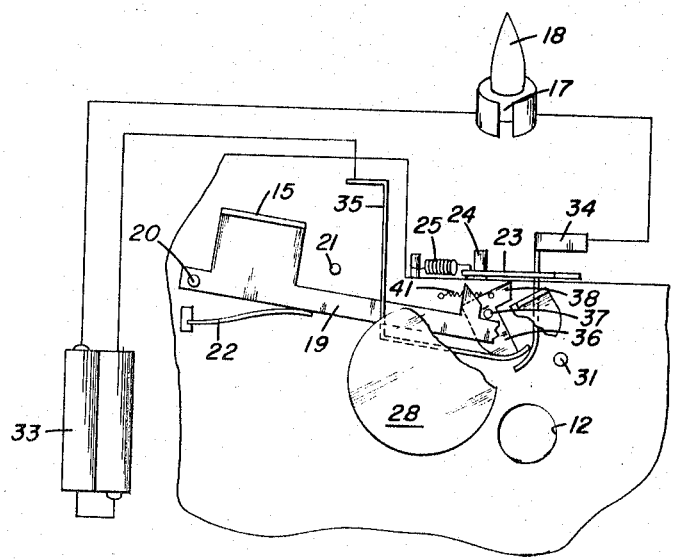
PAUL J. ERNISSE
INVENTOR.
BY
ATTORNEYS

United States Patent Office 3,318,217
Patented May 9, 1967

3,318,217
PHOTOFLASH SYNCHRONIZING MECHANISM
Paul J. Ernisse, Rochester, N.Y., assignor to Eastman Kodak Company, Rochester, N.Y., a corporation of New Jersey
Filed Feb. 23, 1965, Ser. No. 434,410
4 Claims. (Cl. 95—11.5)

This invention relates to photographic cameras and more particularly, to photographic cameras having electrical circuit means for the firing of photoflash lamps to augment scene illumination.

Most prior art photographic cameras include a shutter synchronizing switch which is operable upon closing in timed relation with camera operation to complete a flash lamp firing circuit, thereby firing a photoflash lamp included in the circuit to augment scene light at the instant of film exposure. Usually, shutter synchronizing switches are closed either directly by the depression of a camera operating trigger or by the movement of a shutter blade or a follower part attached to the shutter blade through its operating stroke to engage and close a pair of electrical switch contacts.

Such synchronizing switches have certain disadvantages. For example, a synchronizing switch operable directly from the operating trigger can vary in its closing time from the preset sequence of timing of operation, in that an operator may depress the trigger slowly or erratically. In this manner, the shutter mechanism may be actuated at a time when peak illumination of the flash lamp does not occur. This problem is overcome by closing the synchronizing switch directly by the moving shutter blade. However, the structure necessary to produce a reliable synchronizing switch of this type became complicated because of interference with shutter blade movement, particularly with respect to shutter mechanisms having variable operating speeds.

One means of overcoming certain of the disadvantages in operation has been the inclusion of an electrical shunting circuit, disclosed for example in U.S. Patent 3,139,805. In the case of an included shunting circuit, however, there may exist a continuous drain on the source of electrical potential which may be provided, e.g. batteries.

According to the present invention, however, there is provided a reliable shutter synchronizing switch mechanism which operates to complete a flash firing circuit at a preset time sequence with shutter operating, irrespective of the variation of operation of the camera release trigger. Nevertheless, the switch mechanism according to the present invention is operated without a connection to any moving shutter blade(s) to interfere with shutter blade motion, thereby permitting free shutter action at varied speeds if desired.

The present invention is a novel arrangement for reliable photoflash operation in a photographic camera comprising a structurally independent flash synchronizing switch operable to complete a photoflash firing circuit. Useful particularly in connection with impact-type shutter mechanisms having a shutter striking or impacting driver to actuate the shutter blade(s), the present invention includes a switching cam arm which is independently moved by the impacting driver to close the synchronizing switch at the preset sequence time of operation. Thus, the same impacting driver controls both the shutter blade movement and the switch closing independently of each other.

An important object of the present invention, therefore, is to provide a photographic camera with a new and improved flash synchronizing switch to fire a photoflash lamp in circuit therewith in timed relation with camera operation.

An additional object of the invention is to provide a photoflash synchronizing switch operable to fire a photoflash lamp in timed relation with shutter operation independent of the rate of movement of the camera operating trigger and without a structural connection with the moving shutter.

Yet another object is to provide a synchronizing switch including a switch closing cam actuated in response to an impacting driver which also actuates an impact-type shutter blade when released by the camera operating trigger, the cam and shutter blade being actuated independently of each other.

And still another object of the invention is to provide a simple and inexpensive synchronizing switch mechanism operable to fire a photoflash lamp in a preset timed sequence with camera shutter operation, independently of variation in actuation by an operator and without a structural connection to the camera shutter.

These and other objects and advantages will become more apparent in the course of the following descriptions, the accompanying drawing forming a part thereof and wherein:

FIG. 1 is a perspective view of a simple still photographic camera having a built-in photoflash arrangement which may incorporate the present invention;

FIG. 2 is a simplified perspective view of a preferred embodiment of a shutter and synchronizing switch mechanism according to the present invention, showing only those elements forming a part of or associated directly with the present invention;

FIG. 3 is an exploded view showing the switch closing cam of the described embodiment;

FIG. 4 is a front view showing the relationship of the elements of the described embodiment at one stage of camera operation; and FIG. 5 is a front view showing a second embodiment.

FIG. 1 illustrates a typical photographic still camera in which the present invention may be utilized. The camera includes a conventional light-tight housing 11 with a picture-taking aperture 12 on a taking-axis 13. Lens and shutter-diaphragm systems suitably control the time and opening of the aperture 12 to properly expose a frame of photosensitive film surface which may be disposed on the axis 13 within the housing 11. An accessible film advance and shutter cocking lever 14 is provided to advance a roll of photosensitive film by one frame after each exposure, the film exposure being selectively controlled by a trigger release member 15 which is accessible to an operator from outside the camera housing 11. The camera also includes a flash unit 16 having an electrical socket 17 for receiving a typical photoflash lamp 18. Firing of the photoflash lamp in timed relation with camera operation according to the invention will now be described in detail. However, the present description will be limited to those elements forming part of or cooperating directly with the present invention, the elements of a camera not shown herein being understood to be selected from those known in the art.

Referring to FIG. 2, the shutter trigger release member 15 forms part of a trigger lever 19 mounted within the housing 11 for pivotal movement in the vertical plane about a pivot pin 20. Lever 19 is normally biased upward against a stop 21 formed in the camera housing 11 by a spring 22, camera operation being initiated depressing the release member 15 to rotate trigger lever 19 clockwise against the bias of spring 22.

A shutter striking driver or plate 23, mounted for pivotal movement in the horizontal plane about a pin 24 provides the force required for shutter operation. The force is derived from a strong tension spring 25 which is fixed at one end to the striking plate 23 to be moved rapidly counterclockwise (to the right in FIG. 2) when released in the manner to be described.

The striking plate 23 includes a shutter operating finger 26 integral therewith and extending over the upper edge of trigger lever 19 as shown in FIG. 2. At the upper edge of trigger lever 19 is a latching detent 27 positioned in the path of movement of the lever finger 26 when the lever 19 is in its normal or undepressed position. The latching detent 27 engages finger 26 when in its path to prevent movement of the striking plate 23 to the right until the lever 19 is depressed by the operator to move latching detent 27 out of the path of movement of finger 26.

At the front of the camera housing 11 and covering the picture-taking aperture 12 is a shutter blade 28 which is pivotable about a pivot pin 29 from a position on the picture-taking axis 13 normally covering the aperture 12 (FIG. 2), to a position off the axis 13 (FIG. 4) in which the aperture is temporarily opened for exposure of the frame of film disposed on the axis 13. A spring 30 is provided to bias the shutter blade 28 to its normally closed position against a stop 31 forming part of the camera housing 11, the spring 30 also functioning to automatically return the shutter blade 28 from its open position to its closed position according to a predetermined time sequence.

Integral with the shutter blade 28 is an ear 32 extending upwardly and in the path of movement of the striking plate 23 when the shutter blade 28 is in its closed position. As the lever 19 is depressed to move detent 27 out of the path of movement of the finger 26, the finger moves rapidly to the right (FIG. 2) by the force of spring 25 to strike the ear 32 and pivot the shutter blade 28 against the bias of spring 30 to its open exposure position, the shutter blade 28 then being automatically returned to its normally closed position against stop 31 by the spring 30 in the predetermined time, say 1/40 second. As is known, the exposure time in which the aperture 12 is open can be changed as desired by selectively placing a spring stop member in the path of movement of the shutter blade 28 from its closed position to its open position. In this manner, the opening motion of the shutter blade 28 is arrested and the blade 28 is returned to its closed position in a shorter period of time, say 1/80 second.

For photoflash, the photographic camera is provided a photoflash firing circuit including the photoflash lamp receiving socket 17 with a pair of electrical contacts of known construction and a source of electric potential 33, such as a pair of batteries, mounted within the camera housing 11 and having proper electrical connection with the terminals. One socket contact is electrically connected to a terminal of the potential 33, whereas the other is electrically connected to a circuit switch element 34 of electrically conductive material. The other terminal of the potential 33 is electrically connected to a second, resilient switch element 35 of electrically conductive material, the switch elements 34, 35 being normally biased apart by the resilience of switch element 35 so as to render the firing circuit normally open until the elements 34, 35 are caused to engage each other.

To operate the shutter synchronizing switch in accordance with the present invention there is provided an independently pivotable circuit control cam 36 mounted within the housing 11 for free rotation in the vertical plane about a pivot pin 37. The control cam 36 includes an upright control ear 38 extending into the path of movement of the striking plate finger 26, and as shown in FIG. 2, the control ear 38 is laterally aligned with the latching detent 27 of the trigger release lever 19. The control cam 36 further includes a switch closing cam surface 39 engaging the resilient switch element 35 when cam 36 is rotated clockwise to move the switch element 35 into engagement with switch element 34 and complete the electrical firing circuit.

Referring to FIG. 3, the control cam 36 is provided with a tension spring 41 anchored to the housing 11 at its end to urge the cam in a counterclockwise direction with the control ear 38 in the path of finger 26. The spring 41 is lighter than spring 25 and is thereby overcome when the finger 26 is released to move to the right. Thus, spring 41 operates as a return spring to engage the rear side of the control cam 36 and return the cam 36 to its original position after camera operation, with control ear 38 in the path of finger 26 as shown in FIG. 2.

For photoflash operation, the camera mechanism is cocked, if not already accomplished, by moving the striking plate 23 clockwise against the bias of the spring 25 to the position shown in FIG. 2, all in a manner known in the art, and an unused photoflash lamp 18 is inserted into the socket 17 provided. The camera is then aimed at the desired subject, and the taking of a flash picture is initiated by depressing the accessible trigger release 15.

Referring now to FIG. 4, the relationship of the various elements, after the trigger release has been fully depressed, is shown. As the trigger release 15 is depressed, thereby pivoting the release lever 19 and moving the latching detent 27 downwardly out of the path of movement of the finger 26, the striking plate 23 is caused to move rapidly to the right (FIG. 4) by spring 25. During its initial movement, the striking plate finger 26 engages the control ear 38 and causes the control cam 36 to be rotated clockwise until the cam surface 39 moves switch element 35 into electrical engagement with element 34 (FIG. 4), thereby completing the circuit to the photoflash lamp. The finger 26 continues its movement to the right until it strikes the ear 32 on the shutter blade 28 to rotate the shutter blade and momentarily open the exposure aperture 12 in the manner described.

The shutter is then permitted to return by action of spring 30 to its normally assumed closed position against stop 31 after the predetermined period of time, which is controlled by the impact of plate 23 against ear 32 and the return spring 30 (say 1/40 second). Similarly, the control cam 36 is returned to its initial position by the return spring 41 after the circuit has been closed to fire the lamp 18, readying the synchronizing switch for the next operation of the camera.

In the embodiment shown in FIGS. 2–4, the cam ear 38 is aligned with detent 27 such that the striking plate finger 26 reaches the ear 32 of the shutter blade 28 to initiate opening the aperture after the control cam 36 has caused the firing circuit to be completed. Thus, in the case of a delayed peak illumination lamp such as the AG–1 variety, this arrangement permits initial firing of the photoflash lamp 18 to heat the lamp to its ignition temperature and produce its peak illumination at the time that the shutter blade 28 is moved to its fully open position as shown in FIG. 4. Of course, the position of the control cam along the path of movement of finger 26 may be changed to provide a proper timing for flash lamps having different illumination characteristics.

FIG. 5 shows a second embodiment of a control cam according to the present invention, in which elements performing functions like those of the preferred embodiment are given like prime numbers, and those elements which are not shown are identical.

As in the first embodiment, the control cam 36' is pivoted for movement in direct response to the impactor finger 26' acting on the control ear 38' before it acts on the shutter ear 32'. In the embodiment of FIG. 5, the cam 36' is provided with a hairpin return spring 42 wrapped around the pivot pin 37' in a recess 43. One end 44 of spring 42 is embedded in the heel of cam 36' whereas the other end is free.

The cam 36' is held in the operative position (solid lines) by the resilience of contact element 35'. Thus, as the camera is initially operated, the finger 26' is not required to overcome the force of the return spring 42 until after the contact element 35' engages element 34' to complete the circuit. As the cam 36' continues to rotate clockwise to its full position (dotted lines), however, the free end of spring 42 engages the base plate shown to provide a force for returning the cam 36' in the direction of the operative position. Again, the contact 35' is used to hold the cam 36' in its operative position.

As can now be seen from the embodiment of FIG. 5, cam 36' operates to close the photoflash circuit more rapidly because the return spring 42 does not provide a resistance to cam movement until after the switch is closed.

It can now be seen that the photoflash lamp synchronizing mechanism according to the present invention provides a simple and inexpensive means for reliable coordination of photoflash illumination with camera shutter operation. The switch mechanism operates in a preset constant time relationship with the shutter mechanism primarily because operation of the shutter mechanism and the switch mechanism are directly and independently controlled by the same moving part, i.e., the striking plate. In addition, there are no elements of the switch mechanism which will interfere with or otherwise hinder shutter movement after operation is initiated, and variation in the preset time relationship is not possible even though an operator may depress the trigger release at varying rates.

While the invention has been described with reference to particular embodiments, it is of course understood that modifications and various changes can be resorted to without departing from the spirit of the invention described or the scope of the following claims.

I claim:

1. In a photographic camera, a mechanism for synchronizing photoflash with camera shutter operation comprising:
   an impact-type shutter including a shutter blade movable between a closed position preventing exposure and an open position permitting exposure, and means biasing the shutter blade to its closed position;
   an impact driver movable from a cocked position along a path of movement to a released position and means biasing the driver to move from the cocked position to the released position and strike the shutter blade in its movement to thereby move the shutter blade from the closed position to the open position;
   a photoflash synchronizing switch including a pair of normally open switch elements connectable in an electrical circuit with an ignitable photoflash lamp and a source of electrical potential; and
   a control cam mounted for movement independently of the shutter blade and responsive to the driver during movement of the driver to its released position to close the switch elements and ignite the photoflash lamp.

2. The mechanism according to claim 1 wherein the control cam comprises a pivotable cam element including an ear positionable in the path of movement of the driver to move the control cam and a control surface engaging one of the switch elements to move the switch element into engagement with the other of the switch elements, and return spring means biasing the control cam to cause the control cam to be returned with the ear positioned in the path of movement of the driver after the switch elements are engaged.

3. A shutter synchronizing mechanism for photoflash operation in a camera having means for exposing a photosensitive surface and normally open circuit means including a source of electrical potential and a socket to receive an ignitable photoflash lamp, the mechanism comprising:
   a shutter blade for determining exposure time;
   means to move the shutter blade from a closed position to an open position for exposure;
   accessible trigger release means to actuate the moving means;
   a pair of normally spaced circuit switch elements in the circuit means, the switch elements being physically engageable to close the circuit means and ignite a photoflash lamp in the socket; and
   control means independent of the shutter blade and the trigger release means, the control means being responsive to the moving means to cause the switch elements to physically engage and close the circuit means.

4. The mechanism according to claim 3 wherein the control means comprises a rotatable control cam having a control ear engageable by the moving means to rotate the cam in response to the moving means, and a control cam surface engageable with one of the switch elements to move the one element into engagement with the other of said elements.

References Cited by the Examiner

UNITED STATES PATENTS 3,139,805  7/1964  Peterson _____ 95—11.5

NORTON ANSHER, *Primary Examiner.*

F. L. BRAUN, *Assistant Examiner.*